UNITED STATES PATENT OFFICE.

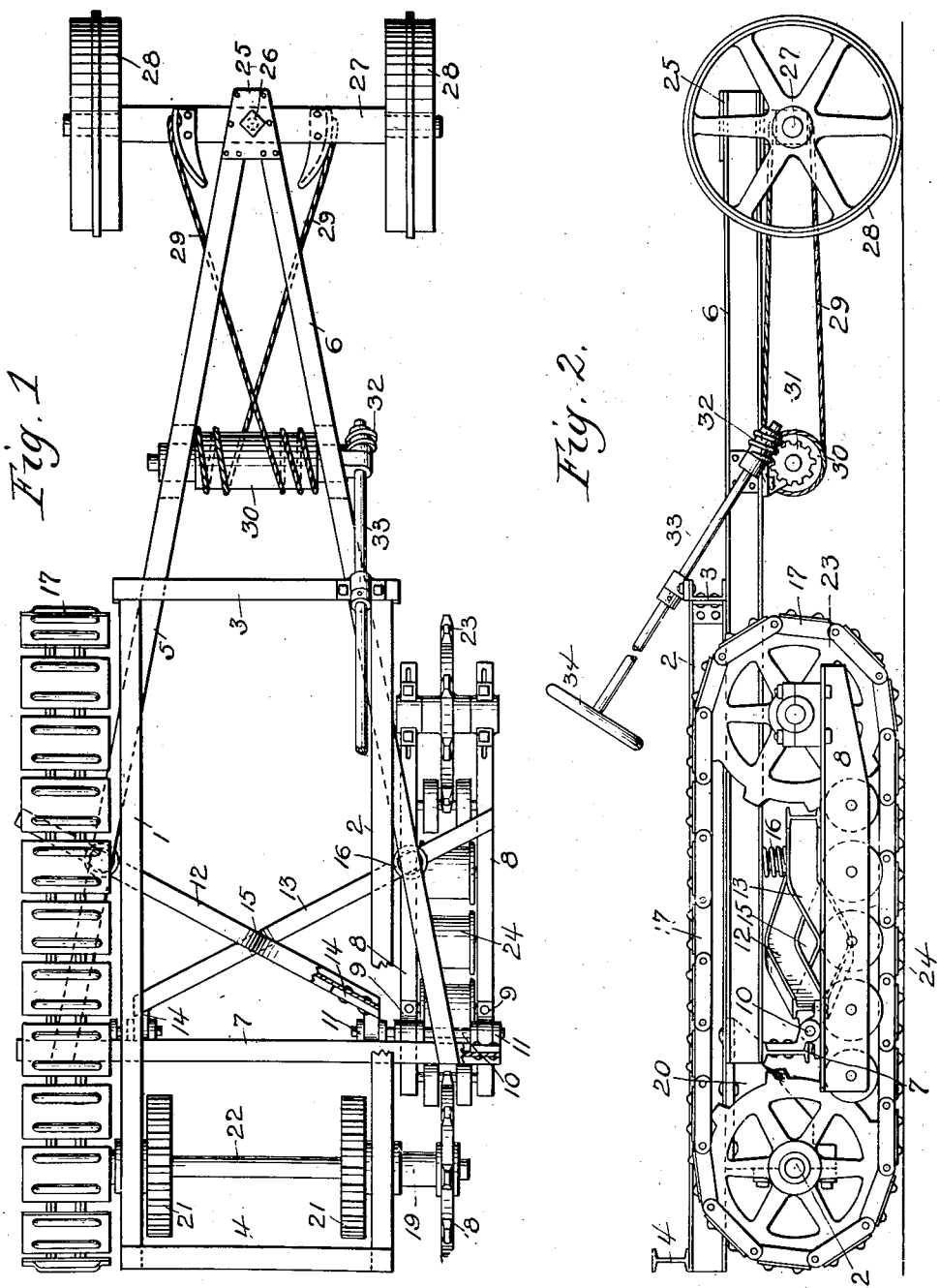

PLINY E. HOLT, OF STOCKTON, CALIFORNIA.

PIVOTED REAR TRACTION-TRUCKS.

1,024,990.   Specification of Letters Patent.   Patented Apr. 30, 1912.

Application filed July 1, 1909. Serial No. 505,386.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Pivoted Rear Traction-Trucks; and I do hereby declare the following to be a full, clear, and exact description of the said invention, such as will enable others skilled in the art to which it most nearly appertains to make, use, and practice the same.

This invention relates to improvements in traction vehicles and more particularly to the running gear thereof and consists in the novel construction and arrangement of the parts as hereinafter described.

The object sought to be accomplished is to provide a horizontally rigid and vertically flexible running gear for tractors propelled by traction belt mechanisms mounted at each side of the frame.

Broadly, the invention consists of a main frame composed of a rectangular super-frame and an isosceles triangular sub-frame having its apex extended beyond the front and its base extended across and beyond the sides of the super-frame; trucks pivoted to the base beam of the said triangular frame; transverse braces pivoted on the same center as the trucks and extending obliquely across the main frame and fixed to the opposite truck frame; buffer springs interposed between the side beams of the triangular frame and the oblique braces at the angle of conjuncture—whereby the main frame remains rigid at all times but the pivoted trucks have a limited vertical play without lateral deviation.

In the drawings:—Figure 1 is a plan view from above of a tractor frame drawn to illustrate this invention, portions of the frame being broken away and duplicate parts omitted to better disclose the construction. Fig. 2 is a side elevation of the same.

In detail, the construction consists of the rectangular superframe comprising the side beams, 1 and 2, and the end beams, 3 and 4. The triangular sub-frame comprises the side beams, 5 and 6, and the base beam, 7. The super and sub-frames are rigidly fixed together at all points of conjunction. The side beams, 8, of the trucks are provided with the pillow blocks, 9, which are pivoted on the pin, 10, in the brackets, 11, fixed to the base beam, 7. The transverse braces, 12 and 13, are provided at one end with the fixed brackets, 14, which engage the pins, 10, which act as a common pivot for the braces and the trucks. Where they pass each other the braces are bent, as at 15, to allow sufficient clearance. These braces lie across and are rigidly fixed to the side beams, 8, of their respective trucks and move as a part thereof. The buffer springs, 16, are interposed between the braces, 12 and 13, and the side beams, 5 and 6, respectively, of the sub-frame. These springs limit the vertical play of the trucks and soften the impact of the traction belt, 17, with the road.

The driving sprockets, 18, are fixed on the sleeves, 19, journaled in the brackets, 20, which are fixed on the super-frame. The driving gears, 21, are fixed on the sleeves, 19, and are adapted to engage a driving mechanism, not shown, adapted to be mounted on the super-frame. The purpose of mounting the driving sprocket on the same foundation as the driving mechanism is to insure proper meshing of the driving gears. It has been common practice heretofore to mount the driving sprocket in the supporting truck; but this has proven deleterious to the gearing, owing to the possibilities of disalinement due to the lost motion between the supporting trucks and the main frame. The floating axle, 22, extends across the machine within the sleeves, 19, to maintain the alinement of the driving gears. The gears, 21, are independently driven by independent clutch mechanisms engaging a motive power mechanism not germane to this invention, and therefore not shown. The idle sprockets, 23, are journaled in the forward ends of the trucks. The endless traction belt, 17, passes around the driving and the idle sprockets, 18 and 23, and beneath the series of rollers, 24, journaled in the trucks.

The apex of the triangular frame which forms the front of the main frame is provided with the pivot head, 25, through which the pivot pin, 26, extends and engages the center of the front axle, 27, upon which the wheels, 28, are mounted. The front axle is swung on its pivot to alter the course of the tractor by the tiller ropes, 29, fixed to the front axle on opposite sides of the pivot. The tiller ropes, 29, are wound in opposite directions around the drum, 30, rotated by a worm gear, 31, which is actuated by a worm, 32, fixed on the steering column, 33, bracketed to the main frame and controlled by the hand wheel, 34, in the usual manner.

It has been the practice heretofore in this class of tractors to construct a rectangular main frame and attach the supporting trucks rigidly thereto. Experience has proven that a rectangular frame cannot withstand the twisting strains incident to the leverage exerted by the length of the traction surface in contact with the ground. This leverage greatly exceeds that exerted by a concentric wheel which concentrates the strains at the axle; whereas the strains of the traction belt mechanism are constant throughout its length which warp and twist the frame, thereby throwing the machinery out of alinement and wrecking the structure generally.

The interposition of the triangular frame arrests the twisting and shearing strains that attack the corners of the rectangular frame, and it adds an oblique resistance impossible in a simple rectangular frame. The pivoting of the supporting trucks allows the traction mechanism to accommodate itself to inequalities in the road without lifting the whole weight of the tractors, or materially affecting the level of the main frame.

It is not essential that both trucks be pivoted. If only one truck was so pivoted it would in a measure lessen the strains on both trucks and on the main frame. Supposing, for instance, one truck only to be pivoted, should the pivoted truck meet an obstruction it would ride over it without a jarring impact and without lifting the truck on the other side. Should the unpivoted truck meet an obstruction it would have to raise the whole frame and subject it to some jar, but the pivoted truck on the opposite side would retain its full bearing on the ground and escape the twisting strain transmitted through the main frame.

This application for patent is drawn with particular reference to the frame and the traction mechanisms immediately connected therewith and constituting the running gear; therefore non-essentials are omitted for the sake of clarity.

Having thus described this invention what is claimed and desired to secure by Letters Patent is:—

1. A tractor running gear comprising a main frame composed of a rectangular frame and a triangular frame having its apex extended beyond the front and its base extended across and beyond the sides of the said rectangular frame; traction trucks pivoted to the base beam of the said triangular frame; transverse braces pivoted on the same center with the truck pivots and extending obliquely across the main frame and fixed to the adjacent truck frame; buffer springs interposed between the triangular frame and the oblique braces at the points of conjuncture; a wheeled truck pivoted under the apex of the triangular frame; means for steering said wheeled truck; driving sprockets bracketed to the main frame; idle sprockets journaled in said traction trucks; supporting rollers journaled in said traction trucks; and traction belts encircling said traction trucks and engaging said driving and idle sprockets.

2. A tractor running gear comprising a main frame composed of a rectangular frame combined with a triangular frame having its apex extended beyond the front and its base extended across and beyond the sides of the said rectangular frame; traction trucks pivoted to the base beam of the said triangular frame; transverse braces pivoted on the base beam of the triangular frame and extending obliquely across the main frame and fixed to the adjacent truck frame; buffer springs interposed between the oblique braces and the main frame; a wheeled truck pivoted under the apex of the triangular frame; and means for steering said wheeled truck.

3. In a running gear for tractors, a combined rectangular and triangular main frame; traction belts encircling supplemental frames pivoted on the said main frame and actuated by a driving sprocket journaled therein; braces extending obliquely across the said main frame, pivoted thereon and each fixed to the opposite supplemental frame; and buffer springs interposed between said braces and said main frame.

4. A tractor running gear comprising a main frame composed of a rectangular frame and a triangular frame having its apex and base angles extended beyond the said rectangular frame; a wheeled steering truck pivoted to the main frame; and traction trucks pivoted at the sides of the main frame.

5. A tractor running gear comprising a triangular main frame, a steering truck pivoted to the main frame, and traction trucks on each side of the main frame and pivoted to the base beam of said triangular frame, said traction trucks having transverse braces extending across and pivoted on the opposite side of the main frame.

6. A tractor running gear comprising a main frame composed of a triangular frame and a superposed rectangular frame, the base beam of the triangular frame projecting beyond the sides of the rectangular frame, traction trucks pivoted at one end to the projecting ends of said base beam, and driving sprockets for said trucks.

7. A tractor running gear comprising a main frame composed of a triangular frame and a superposed rectangular frame, the base beam of the triangular frame projecting beyond the sides of the rectangular frame, traction trucks pivoted at one end to the projecting ends of said base beam, an idler mounted in the free end of each traction truck, driving sprockets supported by said rectangular frame, and traction belts connecting said driving sprockets and idlers.

8. A tractor running gear comprising a main frame composed of a triangular frame and a superposed rectangular frame, the base beam of the triangular frame projecting beyond the sides of the rectangular frame, traction trucks pivoted at one end to the projecting ends of said base beam, braces for said trucks pivotally connected to the base beam of said triangular frame, and driving sprockets for said trucks.

9. A tractor running gear comprising a main frame composed of a rectangular frame and a triangular frame having its base beam extending beyond the opposite sides of said rectangular frame, brackets depending from the base beam of said triangular frame, pivot pins mounted in said brackets, traction trucks pivotally mounted on said pins, and braces for said trucks also pivotally mounted on said pins.

10. A tractor running gear comprising a main frame composed of a rectangular frame and a triangular frame having its base beam extending beyond the opposite sides of said rectangular frame, brackets depending from said base beam, pivot pins mounted in said brackets, traction trucks pivotally mounted on said pins outside of said rectangular frame, braces for said trucks also pivotally connected with said pins inside of said rectangular frame, and driving sprockets for said trucks mounted independently of the latter.

11. A tractor running gear comprising a main frame composed of a rectangular frame and a triangular frame having its base beam extending beyond the opposite sides of said rectangular frame, brackets depending from said base beam, pivot pins mounted in said brackets, traction trucks pivotally mounted on said pins, a brace pivotally connected at one end to each pivot pin and having its other end secured to one of said traction trucks on the opposite side of the frame, and driving belts for said trucks mounted independently of the latter.

In testimony whereof, I have hereunto set my hand this 21st day of June 1909.

PLINY E. HOLT.

Witnesses:
 JESSE VAN VALKENBURG,
 PERCY S. SAUNDERS.